(12) United States Patent
Lawson et al.

(10) Patent No.: US 11,987,186 B2
(45) Date of Patent: May 21, 2024

(54) SYSTEM AND METHOD FOR BADGE INSTALLATION

(71) Applicant: LEAR CORPORATION, Southfield, MI (US)

(72) Inventors: Matthew Lawson, Brighton, MI (US); Eric Groder, Macomb, MI (US); Michael Modreski, Novi, MI (US)

(73) Assignee: Lear Corporation, Southfield, MI (US)

( * ) Notice: Subject to any disclaimer, the term of this patent is extended or adjusted under 35 U.S.C. 154(b) by 212 days.

(21) Appl. No.: 17/824,523

(22) Filed: May 25, 2022

(65) Prior Publication Data

US 2023/0074651 A1 Mar. 9, 2023

Related U.S. Application Data

(60) Provisional application No. 63/241,780, filed on Sep. 8, 2021.

(51) Int. Cl.
*B60R 13/02* (2006.01)
*B60N 2/58* (2006.01)

(52) U.S. Cl.
CPC ........ *B60R 13/0206* (2013.01); *B60N 2/5816* (2013.01); *B60N 2/5891* (2013.01)

(58) Field of Classification Search
CPC . B60R 13/0206; B60R 13/005; B60N 2/5816; B60N 2/5891; B60N 2/6027
See application file for complete search history.

(56) References Cited

U.S. PATENT DOCUMENTS

| 7,065,809 B1 * | 6/2006 | Wesline | B62J 1/12 |
| | | | 5/408 |
| 10,328,869 B2 | 6/2019 | Bober et al. | |
| 2020/0079031 A1 * | 3/2020 | Sellin | C09J 7/26 |
| 2021/0001786 A1 * | 1/2021 | Durupt | B60K 11/085 |

FOREIGN PATENT DOCUMENTS

| CN | 111845498 A | 10/2020 |
| FR | 3014784 A1 | 6/2015 |

* cited by examiner

*Primary Examiner* — Mark R Wendell
(74) *Attorney, Agent, or Firm* — Brooks Kushman P.C.

(57) ABSTRACT

A system and method for installing a badge on a vehicle seat may include placing a trim cover on a badge, and placing a tensioning strip over the trim cover. A retaining plate may be placed over the tensioning strip, and the badge and retaining plate pressed together to capture the trim cover and the tensioning strip therebetween to form an assembly. This assembly may be positioned over a support structure of the vehicle seat such that an A-side of the badge faces toward a front of the vehicle seat. A tensile force may be applied to the tensioning strip in a direction toward a back of the vehicle seat, and the tensioning strip may then be fastened to the support structure of the vehicle seat.

20 Claims, 4 Drawing Sheets

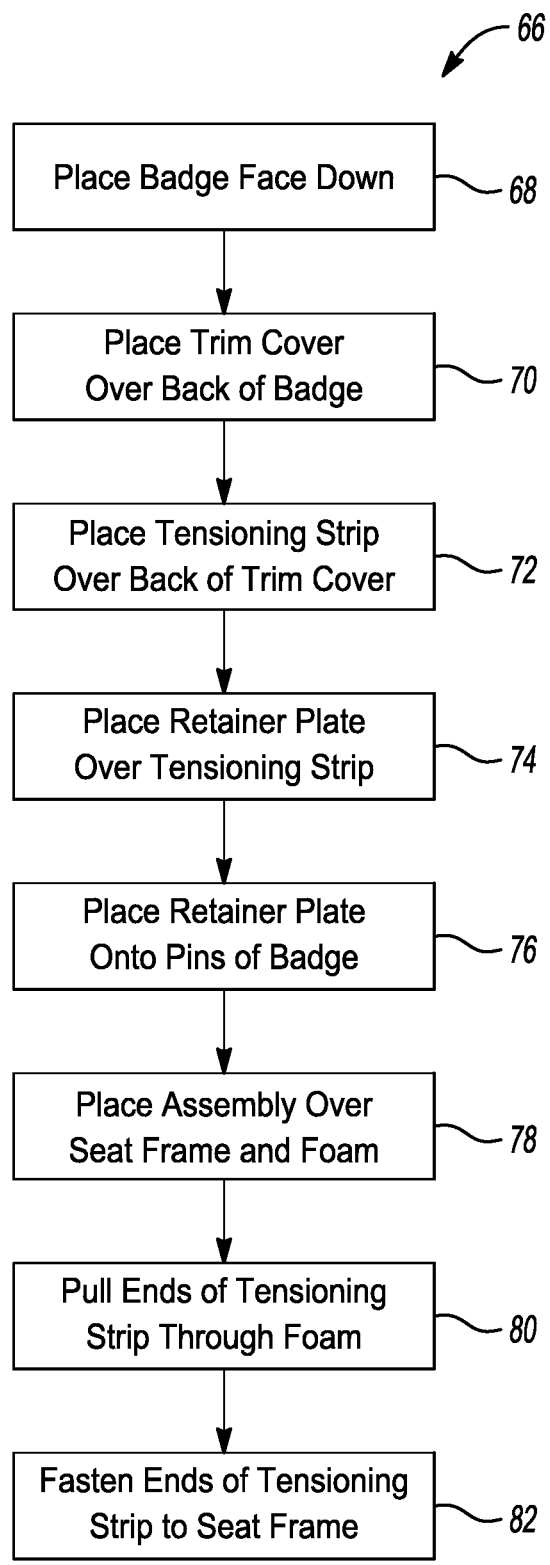

SYSTEM AND METHOD FOR BADGE INSTALLATION

CROSS-REFERENCE TO RELATED APPLICATIONS

This application claims the benefit of U.S. provisional application Ser. No. 63/241,780 filed Sep. 8, 2021, the disclosure of which is hereby incorporated in its entirety by reference herein.

TECHNICAL FIELD

The present disclosure relates to a system and method for badge installation.

BACKGROUND

Product branding comes in many shapes, sizes, and styles. In the automotive industry, it is common to include badges containing company- or product-brand identifiers on the outside of the vehicle and on one or more interior components, such as a seat. When a brand identifier such as a badge is located on a vehicle seat, and it is made from a metallic or other hard material, it would be undesirable to have it located in a position where it could cause discomfort to a seated occupant. To avoid this, the brand identifier may be made from a soft material and sewn or otherwise attached to the seat trim cover. In situations where the badge is made from a hard material, it is typically small and can be placed in a convenient location to avoid discomfort. Although effective, these design considerations necessarily limit the size and type of brand identifiers that can be used. It would therefore be desirable to have a system and method for badge installation that would allow a relatively large badge made from a hard material to be installed on a vehicle seat so that it did not cause discomfort to the seated occupant.

SUMMARY

Embodiments described herein may include a method for installing a badge on a vehicle seat. The method may include the steps of placing an A-side of a trim cover on a B-side of a badge, and placing a tensioning strip over a B-Side of the trim cover. A retaining plate may be placed over the tensioning strip, and the badge and retaining plate pressed together to capture the trim cover and the tensioning strip therebetween to form an assembly. The assembly may be positioned over a support structure of the vehicle seat such that an A-side of the badge faces toward a front of the vehicle seat. A tensile force may be applied to the tensioning strip in a direction generally toward a back of the vehicle seat, and the tensioning strip may then be fastened to the support structure of the vehicle seat.

Embodiments described herein may include a system for installing a badge on a vehicle seat. The system may include a badge arrangement including a retaining plate and a badge having an A-side and a B-side. It may also include a trim cover having a portion disposed between the B-side of the badge and the retaining plate such that an A-side of the trim cover faces the B-side of the badge. Embodiments of the system may also include a tensioning strip having a portion disposed between the B-side of the badge and the retaining plate such that applying a tensile force to the tensioning strip displaces the badge and the portion of the trim cover in the general direction of the tensile force when the trim cover is positioned over a support structure of the vehicle seat.

Embodiments described herein may include a method for installing a badge on a vehicle seat having a trim cover and a support structure. The method may include disposing a tensioning strip over a B-side of the badge and over a B-side of the trim cover to form an assembly. The assembly may be positioned over a support structure of the vehicle seat such that an A-side of the badge and an A-side of the trim cover face toward a front of the vehicle seat. A tensile force may be applied to the tensioning strip in a direction toward a back of the vehicle seat such that a surface of the A-side of the badge is positioned rearward of a surface of the A-side of the trim cover. The tensioning strip may be secured to the support structure of the vehicle seat.

Embodiments described herein may include a method for installing a badge on a vehicle seat having a trim cover and a support structure. The method may include forming an assembly including a tensioning strip and a trim cover disposed between a retaining plate and the badge. The assembly may be positioned over a support structure of the vehicle seat. A tensile force may be applied to the tensioning strip in a direction toward a back of the vehicle seat such that a surface of an A-side of the badge is positioned rearward of a surface of the A-side of the trim cover. The tensioning strip may be secured to the support structure of the vehicle seat.

Embodiments described herein may include a system for installing a badge on a vehicle seat having a trim cover and a support structure. The system may include a badge having an A-side configured to face forward and a B-side configured to face rearward. The B-side of the badge may be disposed on an A-side of the trim cover. The system may also include a tensioning strip disposed on a B-side of the trim cover, and a retaining plate attached to the B-side of the badge such that the tensioning strip and the trim cover are captured between the badge and the retaining plate.

BRIEF DESCRIPTION OF THE DRAWINGS

FIG. 7 shows a flowchart illustrating the steps of a method in accordance with embodiments described herein.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
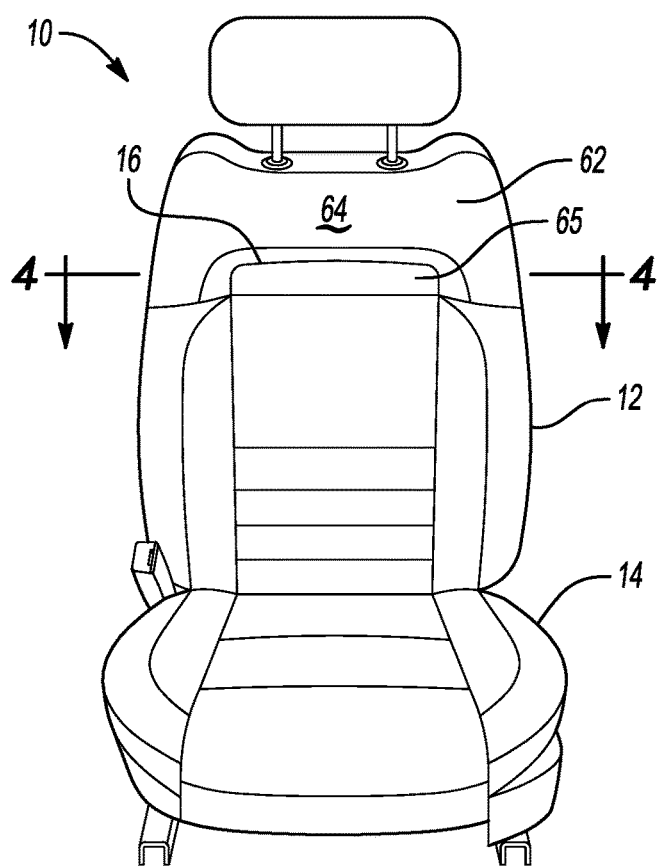
FIG. 1 shows a perspective view of a vehicle seat having a brand identifier assembled in accordance with embodiments described herein.
Figure 2:
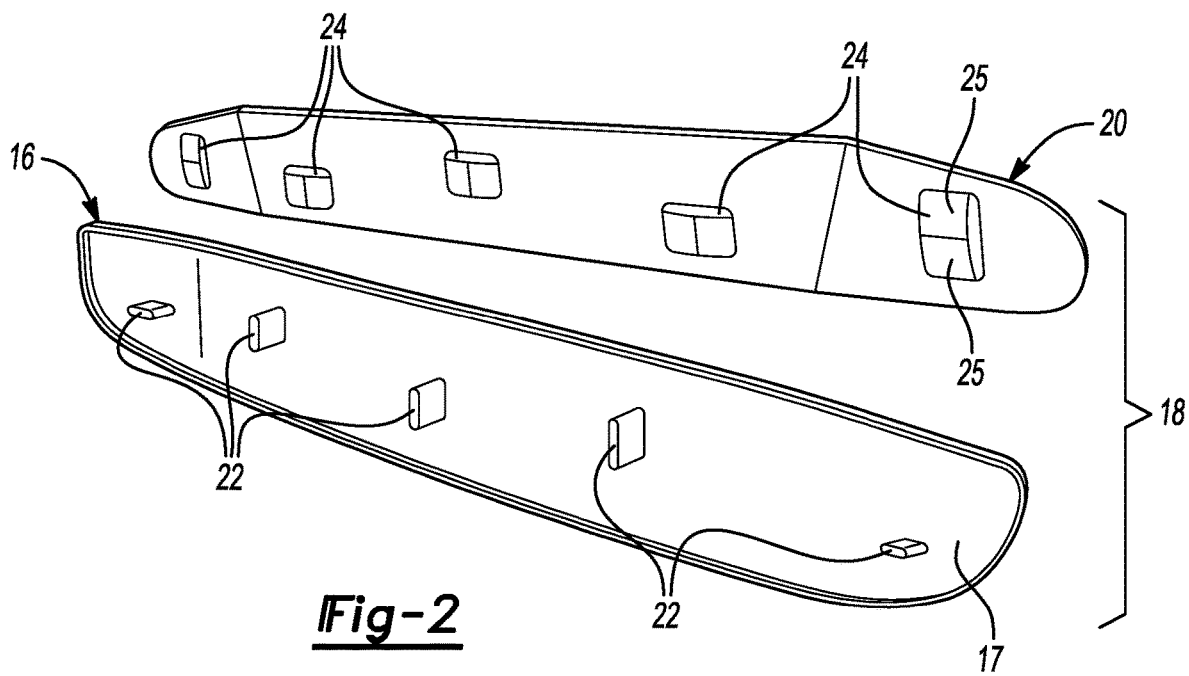
FIG. 2 shows a brand identifier in the form of a badge arrangement having a badge and a retaining plate.

Referring to FIG. 1, a vehicle seat 10 is shown. The seat 10 has a seat back 12 and a seat bottom 14. Attached to the seat back 12 is a brand-identifier plate 16, commonly known as a "badge". As shown in FIG. 2, the badge 16 is part of a badge arrangement 18, which includes the badge 16 and a retaining plate 20. As shown in FIG. 2, extending outward from the back side, or B-side 17, of the badge 16 are a number of elongated members, or "pins" 22, which in this embodiment have the cross section of a small I-beam. The retaining plate 20, which in this embodiment is formed from a stamped metal, includes a number of apertures 24, each of which is formed so that cantilevered leaf springs 25 (only two of which are labeled in FIG. 2 for clarity) capture and secure the pins 22 when the badge 16 is assembled to the retaining plate 20. In this embodiment, the badge 16 includes five of the pins 22, and the retaining plate 20 includes five corresponding apertures 24, although different badges and retaining plates may have a different number of pins and apertures, or a structure other than pins and apertures for attaching the badge to the retaining plate.

Figure 3:
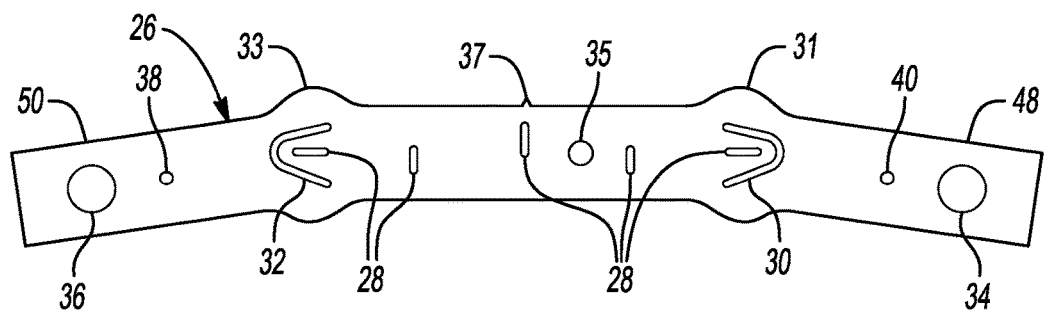
FIG. 3 shows a tensioning strip used as part of a system and method in accordance with embodiments described herein.

FIG. 3 shows a tensioning strip 26, which may be part of a system and used with a method in accordance with embodiments described herein. In this embodiment, the tensioning strip 26 is made from a relatively inextensible material, such as a non-woven polyester. One type of polyester that may be effective for the tensioning strip 26 is referred to as "codon". Tensioning strips, such as the tensioning strip 26, may be made from other materials that are effective to function in an installation of the badge arrangement 18 as described in more detail below. As shown in FIG. 3, the tensioning strip 26 includes a number of apertures 28 that are configured to allow the pins 22 of the badge 16 to pass through them and into the apertures 24 of the retaining plate 20.

Also shown in FIG. 3, the tensioning strip 26 includes first and second plate apertures 30, 32, which in this embodiment are configured as U-shaped slots. As explained in more detail below, the U-shaped slots 30, 32 help to facilitate wrapping the tensioning strip 26 around the ends of the retaining plate 20. The tensioning strip 26 also includes apertures 34, 36, which allow an assembly technician or an automated robotic system to firmly grasp the tensioning strip 26 and apply a tensile force to it during installation. The tensioning strip 26 includes two portions 31, 33 having a greater width than the rest of the tensioning strip 26. These areas 31, 33 of greater width are positioned proximate to the U-shaped slots 30, 32 and provide additional strength when a tensile force is applied to the tensioning strip 26.

The tensioning strip 26 also includes first and second apertures 38, 40, which facilitate attaching the tensioning strip 26 to a support structure of the vehicle seat 10 as further explained below in conjunction with FIG. 6. The tensioning strip 26 further includes an aperture 35, which helps to accurately position the tensioning strip 26 during installation. And similarly, a small tooth 37 helps to correctly orient the tensioning strip 26 by indicating an upward direction as the tensioning strip 26 is intended to be installed. Although some of the apertures are shown as slots and some as round holes, apertures in the tensioning strip 26 may be configured as slots or holes having various configurations, or other shapes depending on their functions and the particular application. And in practice, the apertures shown as slots in FIG. 3 may be little more than thin slits, especially if they are formed in a machine process using a thin cutting blade.

Figure 4:
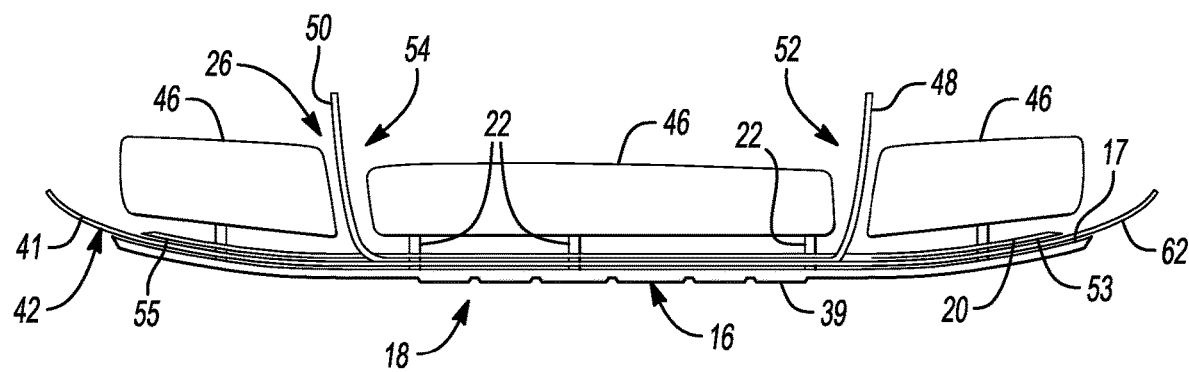
FIG. 4 shows a partially schematic cross-sectional view of the vehicle seat as shown in FIG. 1, taken through line 4-4.

FIG. 4 shows a partially schematic cross section of the badge arrangement 18 installed in the vehicle seat 10. As shown in FIG. 4, the badge 16 is positioned with its branding, located on its A-side 39, facing outward—which is downward as oriented in FIG. 4. Positioned on the back side, or B-side 17, of the badge 16 is a trim cover 42, which may include a spacer material positioned on its B-side 41. Before the retaining plate 20 is pressed onto the badge 16, the tensioning strip 26 is placed over the B-side 41 of the trim cover 42 so that the apertures 28 are positioned over the pins 22 of the badge 16.

Figure 5:
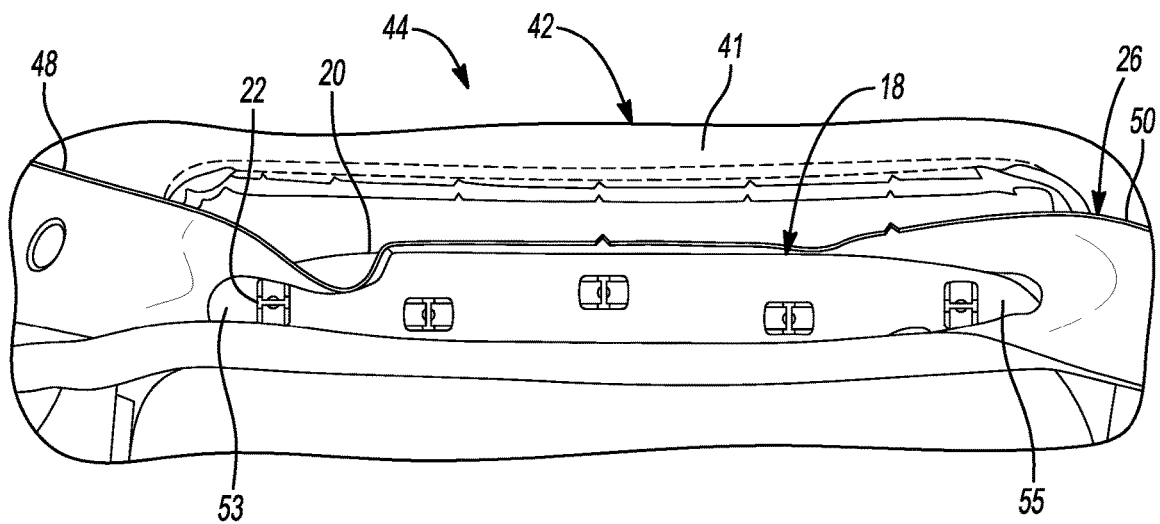
FIG. 5 shows a B-side of a trim cover having the badge arrangement and tensioning strip attached thereto.

Next, the retaining plate 20 is positioned so that the apertures 24 are aligned with the pins 22 of the badge 16. The retaining plate 20 is then pressed onto the badge 16, such that the trim cover 42 and the tensioning strip 26 are secured between them and an assembly 44 is formed. FIG. 5 shows the assembly 44 prior to being installed in a vehicle seat. The assembly 44 is then placed over a support structure 45 of the vehicle seat 10 as shown in FIG. 6. The support structure 45 may include, for example, seat foam 46 and a seat frame 56. The first and second ends 48, 50 of the tensioning strip 26 are then disposed through apertures 52, 54 in the seat foam 46—i.e., the ends 48, 50 are moved from a position in front of the foam 46 to a position in back of the foam 46, which is how they are shown in FIG. 6.

In FIG. 5, the ends 48, 50 of the tensioning strip 26 are shown extending beyond the ends 53, 55 of the retaining plate 20; however, in FIG. 4, the ends 48, 50 of the tensioning strip 26 are positioned inward from the ends 53, 55 of the retaining plate 20. This is because the ends 53, 55 of the retaining plate 20 are positioned so they align with the first and second plate apertures 30, 32 in the tensioning strip 26 when the assembly 44 is assembled. Then when the ends 48, 50 of the tensioning strip 26 are pulled, the first end 53 of the retaining plate 20 is disposed through the first plate aperture 30 and the second end 55 of the retaining plate 20 is disposed through the second plate aperture 32. This causes the ends 48, 50 of the tensioning strip 26 to move inward toward a center of the retaining plate 20. This configuration provides the advantage of not pulling the ends 53, 55 of the retaining plate 20 rearward when a tensile force is applied to the tensioning strip 26, which could have the undesirable effect of causing the ends of the badge 16 to move forward.

Once the ends 48, 50 of the tensioning strip 26 are positioned through the openings 52, 54 in the seat foam 46, they can be tensioned by an assembly technician or an automated robotic system, for example, by pulling on the apertures 34, 36 in the tensioning strip 26. In one embodiment, a technician may apply a tensile force to the tensioning strip 26 by gripping the apertures 34, 36 and manually pulling. In practice, each end 48, 50 of the tensioning strip 26 may be tensioned separately, or both ends may be tensioned simultaneously. Alternatively, an automated robotic system may be employed to capture the apertures 34, 36, or to otherwise secure the ends 48, 50 of the tensioning strip 26, and apply tension to the tensioning strip 26.

Figure 6:
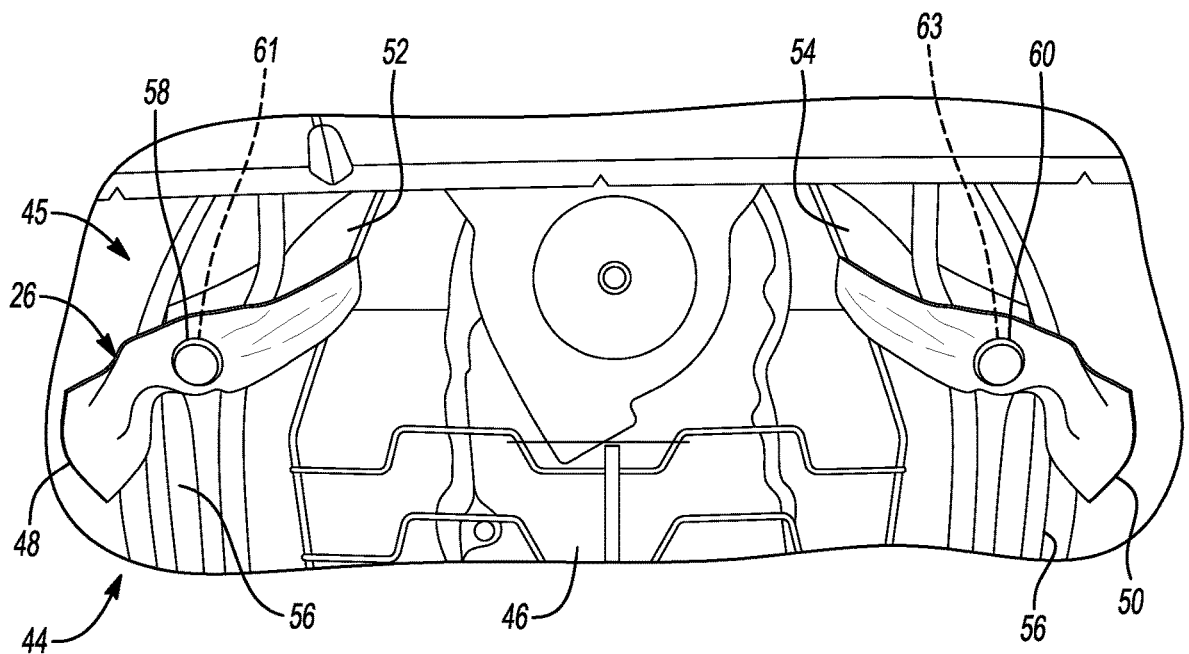
FIG. 6 shows the rear side of the vehicle seat shown in FIG. 1 with a portion of the trim cover removed for visibility.

The tensile force will be applied in a direction that is oriented toward the back of the vehicle seat 10, which is a direction into the page as shown in FIG. 1 and out of the page as shown in FIG. 6. It is understood that the tensile force may be applied in a direction "toward the back of the seat" without being applied in a straight rearward direction. For example, as shown in FIG. 6, the tensioning strip 26 may be tensioned at an angle relative to the back of the seat 10 and yet may still be considered in a direction toward the back of the seat 10. As used herein, and unless stated differently, directions such as "front", "back", "forward", "rearward", etc. refer to an orientation of the seat 10 as it would be traditionally oriented when installed in a vehicle—i.e., the front of the seat is oriented toward a front of the vehicle and the back of the seat is oriented toward a back of the vehicle.

After the tensile force is applied to the tensioning strip 26, its ends 48, 50 are then secured to a support structure of the seat 10, such as the seat frame 56. First and second fasteners 58, 60—for example, Christmas-tree fasteners—are respectively inserted through the apertures 38, 40 in the tensioning strip 26 and into first and second apertures 61, 63 in the seat frame 56. Some or all of this process may be performed manually by a technician, or by an automated process using a robotic system. In general, the tensioning strip 26 is tensioned until the first aperture 38 in the tensioning strip 26 is aligned with the first aperture 61 in the seat frame 56, and the first fastener 58 is positioned through both apertures 38, 61. Similarly, the tensioning strip 26 is tensioned until the second aperture 40 in the tensioning strip 26 is aligned with the second aperture 63 in the seat frame 56, and the second fastener 60 is positioned through both apertures 40, 63.

As the ends 48, 50 of the tensioning strip 26 are tensioned, the badge 16 on the A-side 62 of the trim cover 42—see FIGS. 1 and 4—is pulled into a recessed position in the seat foam 46. This is illustrated in FIG. 1, which shows a surface 64 of the A-side 62 of the trim cover 42. The surface 64 is the primary contact surface for a seated occupant. As shown in FIG. 1, a surface 65 of the A-side 39 of the badge 16 is positioned below—i.e., rearward of—the surface 64, which reduces the likelihood that the badge 16 will come into contact with a seated occupant.

FIG. 7 shows a flowchart 66 summarizing the steps of a method in accordance with embodiments described herein. It is understood that other embodiments may include all or only some of these steps, and may include additional steps not illustrated in FIG. 7. Although the steps of the flowchart 66 are shown sequentially, it is understood that at least some of the steps may be performed in an order that is different from the one shown in the drawing figure. For convenience, the vehicle seat 10, the badge 16, and other components illustrated and described in conjunction with FIGS. 1-6 will be used for reference in the description of the method. The process starts at step 68, where the badge 16 is placed face downward, so that the A-side 39 of the badge 16 is oriented downward and the B-side 17 is oriented upward.

At step 70, the trim cover 42 is placed over the back of the badge 16. More specifically, and A-side 62 of the trim cover 42 is placed over the badge 16 so that it faces the B-side 17 of the badge 16. The tensioning strip 26 is placed over the back or B-side 41 of the trim cover 42 at step 72. In particular, the apertures 28 in the tensioning strip 26 are positioned over the corresponding pins 22 extending from the B-side 17 of the badge 16. At step 74, the retaining plate 20 is placed over the tensioning strip 26 so that the apertures 24 in the retaining plate 20 align with the pins 22 in the badge 16. The retaining plate 20 and the badge 16 are pressed together at step 76 so that the pins 22 extend through the apertures 24 in the retaining plate 20 and are secured by the leaf springs 25 formed in the apertures 24. This forms the assembly 44, which, at step 78, is placed over a structure of the seat 10, which includes the foam 46 and the seat frame 56. At step 80, the ends 48, 50 of the tensioning strip 26 are pulled through the openings 52, 54 in the foam 46, and at step 82 they are fastened to the seat frame 56, thereby securing the tensioning strip 26 and maintaining the badge 16 in the desired recessed position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for installing a badge on a vehicle seat having a trim cover and a support structure, the method comprising:
    disposing a tensioning strip over a B-side of the badge and over a B-side of the trim cover to form an assembly;
    positioning the assembly over the support structure of the vehicle seat such that an A-side of the badge and an A-side of the trim cover face toward a front of the vehicle seat;
    applying a tensile force to the tensioning strip in a direction toward a back of the vehicle seat such that a surface of the A-side of the badge is positioned rearward of a surface of the A-side of the trim cover; and
    securing the tensioning strip to the support structure of the vehicle seat.

2. The method of claim 1, further comprising:
    placing a retaining plate over the tensioning strip; and
    pressing the badge and retaining plate together to capture the trim cover and the tensioning strip therebetween to secure the tensioning strip and form the assembly.

3. The method of claim 2, wherein the retaining plate includes a first end and a second end, and the tensioning strip includes a first end, a second end, a first plate aperture, and a second plate aperture, and wherein the retaining plate is placed over the tensioning strip such that the first end of the retaining plate aligns with the first plate aperture and the second end of the retaining plate aligns with the second plate aperture, the method further comprising pulling the first and second ends of the tensioning strip such that the first end of the retaining plate is disposed through the first plate aperture and the second end of the retaining plate is disposed through the second plate aperture, and the first and second ends of the tensioning strip are disposed toward a center of the retaining plate.

4. The method of claim 1, wherein the tensioning strip includes a first aperture disposed therethrough, and the tensile force is applied to the tensioning strip until the first aperture in the tensioning strip is aligned with a first aperture in the support structure, and the tensioning strip is secured to the support structure by positioning a first fastener through the first aperture in the tensioning strip and through the first aperture in the support structure.

5. The method of claim 4, wherein the first aperture in the tensioning strip is disposed proximate to a first end of the tensioning strip, and the tensioning strip includes a second aperture disposed therethrough proximate to a second end of the tensioning strip, and wherein the tensile force is applied to the tensioning strip until the second aperture in the tensioning strip is aligned with a second aperture in the support structure, and the tensioning strip is further secured to the support structure by positioning a second fastener through the second aperture in the tensioning strip and through the second aperture in the support structure.

6. The method of claim 5, wherein the tensile force is applied to the first and second ends of the tensioning strip simultaneously.

7. The method of claim 5, wherein the support structure includes a seat frame and seat foam, the method further comprising disposing the first and second ends of the tensioning strip through respective apertures in the seat foam such that the first and second ends of the tensioning strip are positioned in back of the seat foam before the tensile force is applied to the tensioning strip.

8. The method of claim 1, wherein the support structure includes a seat frame and seat foam, and the tensioning strip includes first and second ends, the method further comprising disposing the first and second ends of the tensioning strip through respective apertures in the seat foam such that the first and second ends of the tensioning strip are positioned in back of the seat foam before the tensile force is applied to the tensioning strip.

9. A method for installing a badge on a vehicle seat having a trim cover and a support structure, the method comprising:
    forming an assembly including a tensioning strip and a trim cover disposed between a retaining plate and the badge;
    positioning the assembly over a support structure of the vehicle seat;
    applying a tensile force to the tensioning strip in a direction toward a back of the vehicle seat such that a surface of an A-side of the badge is positioned rearward of a surface of the A-side of the trim cover; and
    securing the tensioning strip to the support structure of the vehicle seat.

10. The method of claim 9, wherein the support structure includes a seat frame and seat foam, and the tensioning strip includes first and second ends, the method further comprising disposing the first and second ends of the tensioning strip through respective apertures in the seat foam such that the first and second ends of the tensioning strip are positioned in back of the seat foam before the tensile force is applied to the tensioning strip.

11. The method of claim 9, wherein the tensioning strip includes a first aperture disposed therethrough, and the tensile force is applied to the tensioning strip until the first aperture in the tensioning strip is aligned with a first aperture in the support structure, and the tensioning strip is secured to the support structure by positioning a first fastener through the first aperture in the tensioning strip and through the first aperture in the support structure.

12. The method of claim 11, wherein the first aperture in the tensioning strip is disposed proximate to a first end of the tensioning strip, and the tensioning strip includes a second aperture disposed therethrough proximate to a second end of the tensioning strip, and wherein the tensile force is applied to the tensioning strip until the second aperture in the tensioning strip is aligned with a second aperture in the support structure, and the tensioning strip is further secured to the support structure by positioning a second fastener through the second aperture in the tensioning strip and through the second aperture in the support structure.

13. The method of claim 9, wherein the retaining plate includes a first end and a second end, and the tensioning strip includes a first end, a second end, a first plate aperture, and a second plate aperture, and wherein the retaining plate is placed over the tensioning strip such that the first end of the retaining plate aligns with the first plate aperture and the second end of the retaining plate aligns with the second plate aperture, the method further comprising pulling the first and second ends of the tensioning strip such that the first end of the retaining plate is disposed through the first plate aperture and the second end of the retaining plate is disposed through the second plate aperture, and the first and second ends of the tensioning strip are disposed toward a center of the retaining plate.

14. The method of claim 13, wherein the support structure includes a seat frame and seat foam, and the tensioning strip includes first and second ends, the method further comprising disposing the first and second ends of the tensioning strip through respective apertures in the seat foam such that the first and second ends of the tensioning strip are positioned in back of the seat foam before the tensile force is applied to the tensioning strip.

15. A system for installing a badge on a vehicle seat having a trim cover and a support structure, the system comprising:
    a badge having an A-side configured to face forward and a B-side configured to face rearward, the B-side of the badge being disposed on an A-side of the trim cover;
    a tensioning strip disposed on a B-side of the trim cover; and
    a retaining plate attached to the B-side of the badge such that the tensioning strip and the trim cover are captured between the badge and the retaining plate.

16. The system of claim 15, wherein the retaining plate includes a first end and a second end, and the tensioning strip includes a first plate aperture and a second plate aperture, and wherein the retaining plate is attached to the B-side of the badge such that the first end of the retaining plate aligns with the first plate aperture and the second end of the plate aligns with the second plate aperture.

17. The system of claim 16, wherein the first and second plate apertures are configured as U-shaped slots.

18. The system of claim 15, wherein the tensioning strip includes
    a first end and a second end, and a first aperture and a second aperture, the first and second apertures being respectively disposed proximate to the first and second ends to facilitate tensioning the first and second ends in a rearward direction.

19. The system of claim 18, wherein a surface of the A-side of the badge is positioned rearward of a surface of the A-side of the trim cover when the first and second ends of the tensioning strip are tensioned in a rearward direction.

20. The system of claim 19, wherein the first and second ends of the tensioning strip are secured to the support structure after the first and second ends of the tensioning strip are tensioned in a rearward direction.

* * * * *